(12) United States Patent
Hong (10) Patent No.: US 10,585,538 B2
(45) Date of Patent: *Mar. 10, 2020

(54) CONTROL METHOD AND CONTROL DEVICE FOR TOUCH SENSOR PANEL

(71) Applicant: HiDeep Inc., Gyeonggi-do (KR)

(72) Inventor: Moonki Hong, Gyeonggi-do (KR)

(73) Assignee: HIDEEP INC. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,934

(22) Filed: Mar. 5, 2018

(65) Prior Publication Data

US 2018/0196550 A1 Jul. 12, 2018

Related U.S. Application Data

(63) Continuation of application No. 14/734,208, filed on Jun. 9, 2015, now Pat. No. 9,946,415.

(30) Foreign Application Priority Data

Jun. 10, 2014 (KR) ........................ 10-2014-0070096

(51) Int. Cl.
*G06F 3/044* (2006.01)
*G06F 3/041* (2006.01)
*G06F 3/0488* (2013.01)

(52) U.S. Cl.
CPC ............ *G06F 3/044* (2013.01); *G06F 3/0418* (2013.01); *G06F 3/04883* (2013.01)

(58) Field of Classification Search
CPC .... G06F 3/044; G06F 3/0418; G06F 3/04883; G06F 3/03545; G06F 3/041; G06F 3/0416; G06F 3/03549; G06F 3/038
See application file for complete search history.

(56) References Cited

U.S. PATENT DOCUMENTS

| 2007/0152976 | A1* | 7/2007 | Townsend | G06F 3/0416 345/173 |
| 2009/0095540 | A1* | 4/2009 | Zachut | G06F 3/044 178/18.03 |
| 2011/0291944 | A1 | 12/2011 | Simmons et al. | |
| 2012/0262407 | A1* | 10/2012 | Hinckley | G06F 3/038 345/173 |
| 2012/0293454 | A1 | 11/2012 | Tsai et al. | |
| 2013/0257793 | A1 | 10/2013 | Zeliff et al. | |

(Continued)

FOREIGN PATENT DOCUMENTS

KR 1020120082577 7/2012

*Primary Examiner* — Richard J Hong
(74) *Attorney, Agent, or Firm* — The Belles Group, P.C.

(57) ABSTRACT

In one embodiment, a control method for a touch sensor panel is disclosed. The method includes obtaining touch information on the touch sensor panel from which an electrical signal outputted is changed according to a touch, and detecting at least one valid touch from the touch information. It is determined that a valid touch of the at least one valid touch is included in a palm touch group by (a) detecting a palm touch, which meets a palm touch condition, among the at least one valid touch, and (b) determining that the detected palm touch and the valid touch occur within a predetermined time period. A display unit displays an input corresponding to each of the at least one valid touch other than the valid touch included in the palm touch group.

20 Claims, 5 Drawing Sheets

(a)

(b)

(56) References Cited

U.S. PATENT DOCUMENTS

| | | | |
|---|---|---|---|
| 2013/0300672 A1* | 11/2013 | Griffin | G06F 3/04883 345/173 |
| 2013/0300696 A1* | 11/2013 | Haran | G06F 3/041 345/173 |
| 2013/0321328 A1* | 12/2013 | Ahn | G06F 3/03549 345/174 |
| 2013/0328810 A1 | 12/2013 | Li et al. | |
| 2013/0328832 A1 | 12/2013 | Boumgarten | |
| 2014/0104225 A1* | 4/2014 | Davidson | G06F 3/044 345/174 |
| 2014/0300588 A1 | 10/2014 | Nakada | |
| 2016/0077663 A1* | 3/2016 | Durojaiye | G06F 3/03545 345/173 |

* cited by examiner

CONTROL METHOD AND CONTROL DEVICE FOR TOUCH SENSOR PANEL

CROSS REFERENCE TO RELATED APPLICATIONS

This application is a continuation of U.S. patent application Ser. No. 14/734,208, filed Jun. 9, 2015, which claims priority under 35 U.S.C. § 119 to Korean Patent Application No.: 10-2014-0070096, filed Jun. 10, 2014. The disclosures of the aforementioned priority applications are incorporated herein by reference in their entirety.

FIELD OF THE INVENTION

The present invention relates to a control method and a control device for a touch sensor panel, and more particularly to a method for identifying and removing a palm touch on the touch sensor panel and a control device of the touch sensor panel, which performs the same.

BACKGROUND OF THE INVENTION

A touch sensor panel is a device for inputting information by performing a touch operation (hereafter, referred to as touch) on a character or particular position displayed on a screen through use of an object like a user's finger or stylus pen without using an input device like a keyboard or mouse. The touch sensor panel can be used in various configurations such as electronic devices including a personal data assistant (PDA) and a portable terminal, a variety of electronic products, an automatic teller machine, etc.

For example, the touch sensor panel is a transparent panel including a touch-sensitive surface and may configure a touch screen by being attached to the front side, etc., of a display panel. As such, the touch sensor panel is used together with the display panel, etc., and thus, can be used as an interactive graphic input device which allows the user to designate a position by himself/herself while watching the screen.

In particular, when the user draws or writes by touching the touch sensor panel through the object like the stylus pen or finger, it is quite probable that a touch by palm other than the object is erroneously regarded as an input action. Therefore, research is being conducted to exclude the touch by palm from a touch input on the touch sensor panel.

SUMMARY OF THE INVENTION

In one embodiment, a control method for a touch sensor panel is disclosed, the method comprising obtaining touch information on the touch sensor panel from which an electrical signal outputted is changed according to a touch; detecting at least one valid touch from the touch information; determining that a valid touch of the at least one valid touch is included in a palm touch group by (a) detecting a palm touch, which meets a palm touch condition, among the at least one valid touch, and (b) determining that the detected palm touch and the valid touch occur within a predetermined time period; and displaying, on a display unit, an input corresponding to each of the at least one valid touch other than the valid touch included in the palm touch group.

In another embodiment, a control device of a touch sensor panel is disclosed, the control device comprising a touch information detector which obtains touch information on the touch sensor panel from which an electrical signal outputted is changed according to a touch; a processor which detects at least one valid touch from the touch information and determines that a valid touch of the at least one valid touch is included in a palm touch group by (a) detecting a palm touch, which meets a palm touch condition, among the at least one valid touch, and (b) determining that the detected palm touch and the valid touch occurs within a predetermined time period; and a controller configured to cause a display unit to display an input corresponding to each of the at least one valid touch other than the valid touch included in the palm touch group.

Another embodiment is a method for controlling a touch sensor panel according to an embodiment of the present invention. The control method includes: obtaining touch information on the touch on the touch sensor panel from which an electrical signal outputted is changed according to a touch; detecting at least one valid touch from the touch information; determining the valid touch which is included in a palm touch group among the at least one valid touch; and displaying an input corresponding to the valid touch other than the valid touch which is included in the palm touch group among the at least one valid touch, on a display unit.

Yet another embodiment is a control device of the touch sensor panel according to the embodiment of the present invention. The control device includes: a touch information detector which obtains touch information on the touch sensor panel from which an electrical signal outputted is changed according to a touch; a processor which detects at least one valid touch from the touch information and determines the valid touch which is included in a palm touch group among the at least one valid touch; and a controller which causes a display unit to display an input corresponding to the valid touch other than the valid touch which is included in the palm touch group among the at least one valid touch.

DETAILED DESCRIPTION OF THE INVENTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Similar reference numerals in the drawings designate the same or similar functions in many aspects.

Hereafter, in an apparatus 1000 including a touch sensor panel according to an embodiment of the present invention, a method for removing and/or identifying a palm touch and a control device 800 performing the same will be described with reference to the accompanying drawings.

Figure 1:
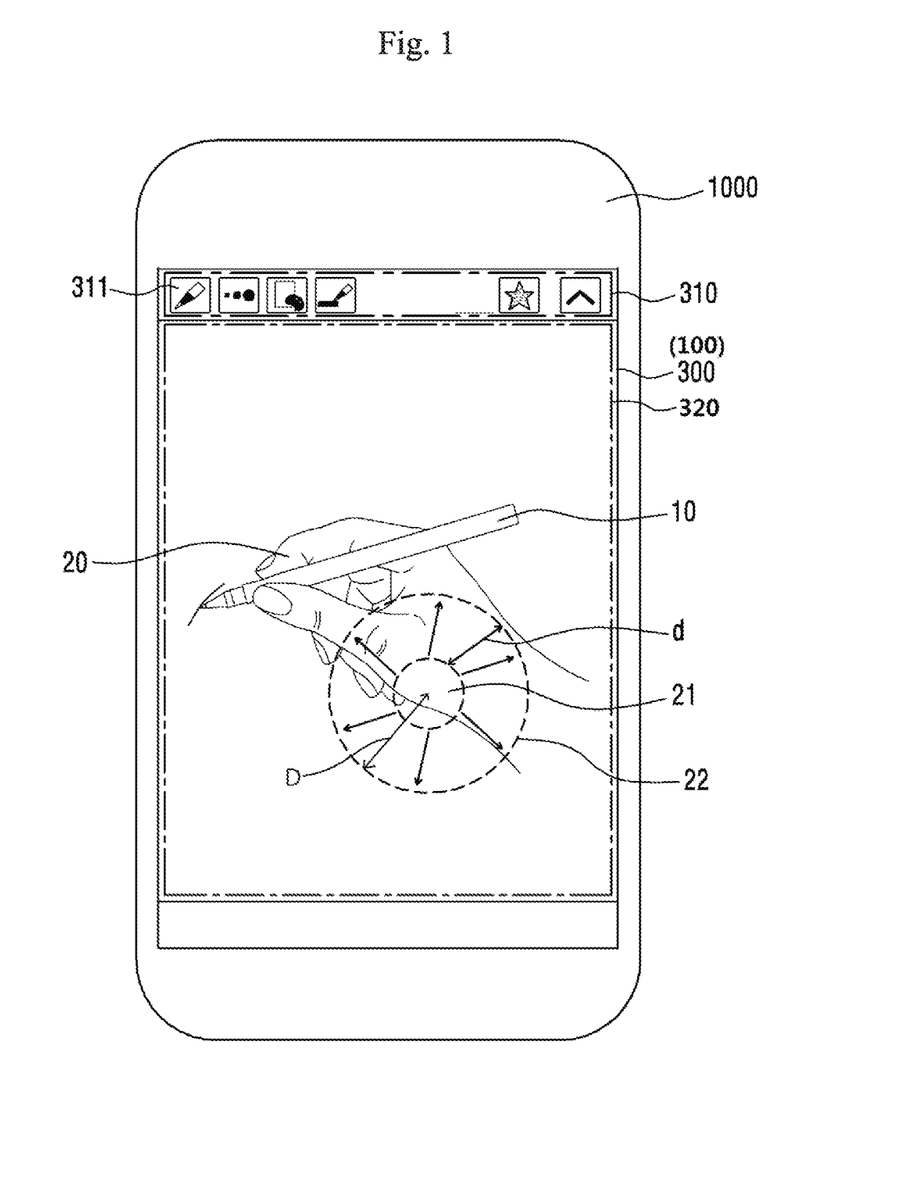
FIG. 1 is a view for describing a palm touch in an apparatus including a touch sensor panel according to an embodiment of the present invention.

FIG. 1 is a view for describing the palm touch in the apparatus including the touch sensor panel according to the embodiment of the present invention. In the apparatus 1000 including the touch sensor panel of FIG. 1, an example is shown where a touch screen is configured by attaching the touch sensor panel 100 to a display panel constituting a display unit 300. Therefore, a user can perform a touch input operation by directly touching the screen of the display unit 300. Such an input action can be directly displayed on the screen of the display unit 300.

FIG. 1 shows that the input on the touch sensor panel 100 by a touch of an object 10 is displayed on the display unit 300. Here, a stylus pen is used as an example of the object 10. A portion 310 of the screen of the display unit 300 of FIG. 1 shows that the stylus pen has been selected as a touch object through an icon 311. An action corresponding to the input by the touch of the object 10 may be displaying a position corresponding to the touch on the display unit 300. Therefore, in accordance with the movement of the object 10 on the touch surface of the touch sensor panel 100, the movement of the touch may be, as shown in FIG. 1, tracked and displayed on the display unit 300.

Here, as shown in FIG. 1, when a touch is input by the object 10, user's hand 20 holding the object 10 may touch the touch sensor panel 100. Here, this touch of the user may be also determined as a touch input and be displayed on the display unit 300. However, this touch is not intended by the user, and thus, needs to be prevented from being displayed on the display unit 300.

When the user touches the touch sensor panel 100 with the object 10, the user should be careful not to allow other things other than the object 10 to touch the touch sensor panel 100. However, when the user performs a delicate work such as drawing, writing, etc., on the touch sensor panel 100, the accuracy of the touch input may be deteriorated or wrist fatigue of the user may be increased by long-term input action.

Therefore, the embodiment of the present invention provides a method for identifying/removing the palm touch such that the palm touch can be excluded from the touch input even when the user's hand, particularly, the palm of the user touches the touch sensor panel 100 in the user's touch on the touch sensor panel 100 through the object 10. The method for identifying/removing the palm touch and the control device 800 of the touch sensor panel 100 which performs the same in accordance with the embodiment of the present invention will be described in detail with reference to FIGS. 2 to 5.

Figure 2:
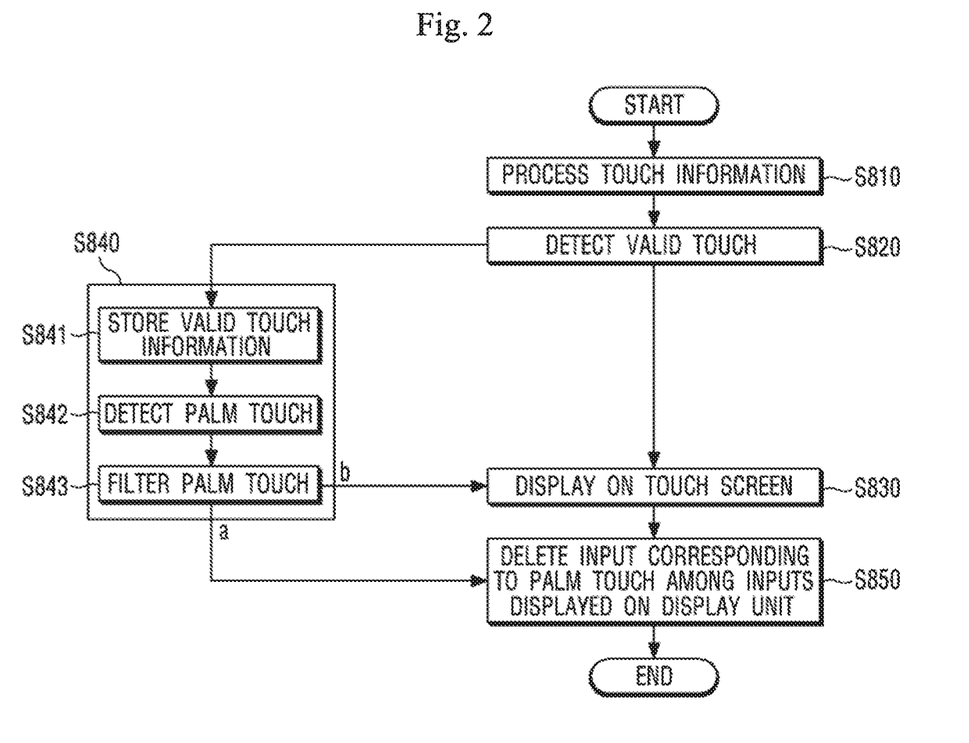
FIG. 2 is a flowchart showing a method for removing the palm touch in the touch sensor panel according to the embodiment of the present invention.

FIG. 2 is a flowchart showing the method for removing the palm touch in apparatus 1000 including the touch sensor panel according to the embodiment of the present invention. As shown in FIG. 2, the method may include obtaining touch information based on the touch on the touch sensor panel 100 from which an electrical signal outputted is changed according to the touch (S810); detecting at least one valid touch from the touch information (S820); determining the valid touch which is included in a palm touch group among the at least one valid touch (S840); and displaying the input corresponding to the valid touch other than the valid touch which is included in the palm touch group among the at least one valid touch, on the display unit (S830 and S850).

The method shown in FIG. 2 for removing the palm touch in accordance with the embodiment of the present invention will be described in detail with reference to the apparatus 1000 which includes the touch sensor panel 100 performing the same.

Figure 3:
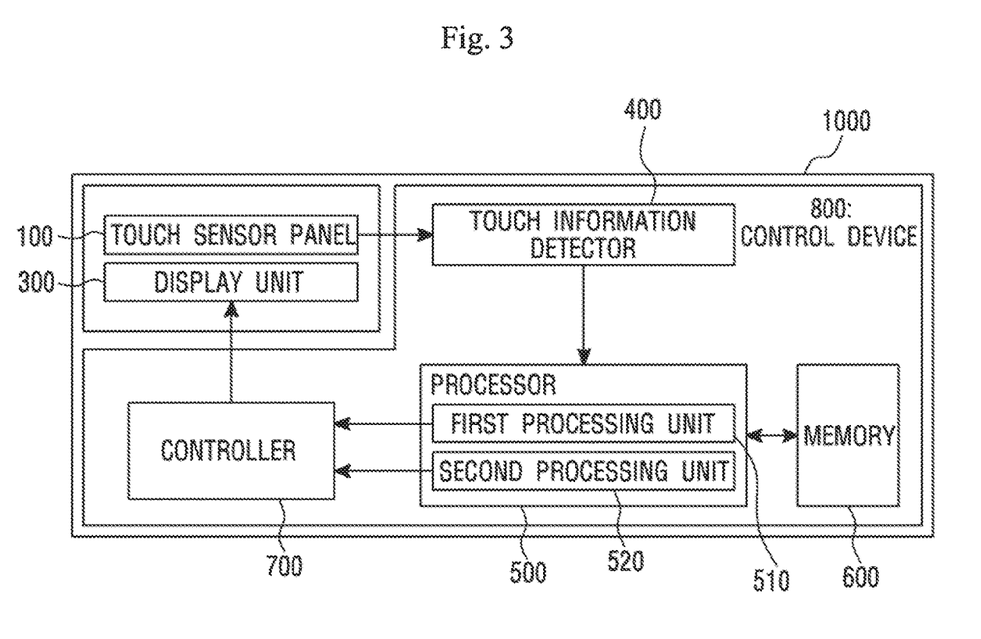
FIG. 3 is a structure view showing the apparatus including the touch sensor panel according to the embodiment of the present invention.

First, the apparatus 1000 including the touch sensor panel 100 according to the embodiment of the present invention will be briefly described. FIG. 3 is a structure view showing the apparatus including the touch sensor panel according to the embodiment of the present invention. The apparatus 1000 according to the embodiment of the present invention may include the touch screen 100 and the control device 800 of the touch sensor panel 100.

The apparatus 1000 including the touch sensor panel 100 according to the embodiment of the present invention may be a portable electronic device such as a laptop computer, a personal digital assistant (PDA), and a smart phone. Also, apparatus 1000 according to the embodiment of the present invention may be a non-portable electronic device such as a desktop computer, and a smart television.

The apparatus 1000 including the touch sensor panel 100 according to the embodiment of the present invention may include the touch sensor panel 100 and the display unit 300. The touch sensor panel 100 according to the embodiment of the present invention may be configured to form the touch screen by being attached to the display unit 300. It can be considered that the touch sensor panel 100 and the display unit 300 are separated from each other. It is enough as long as the touch input on the touch sensor panel 100 is displayed on the display unit 300. The display unit 300 according to the embodiment of the present invention may include, for example, the display panel. The display unit 300 includes a screen allowing the user to visually check the contents displayed on the display unit. Here, the display unit 300 may be driven by a driver which causes the contents to be displayed on the display unit 300.

The touch sensor panel 100 according to the embodiment of the present invention allows the user to operate a computing system by simply touching the touch sensor panel 100 with the object, i.e., a finger, etc. In general, the touch sensor panel 100 recognizes the touch and touch position thereon, and then the computing system analyzes the touch and performs operations in accordance with the analysis.

Since the electrical signal which is output is changed by the touch on the touch sensor panel 100, the touch sensor panel 100 according to the embodiment of the present invention is configured to detect whether or not and where the touch has occurred on the touch sensor panel 100. Also, the touch sensor panel 100 according to the embodiment of the present invention may be configured to detect the magnitude of the touch pressure when the touch occurs on the touch sensor panel 100. The touch sensor panel 100 may include any panel which is configured to detect whether or not the touch has occurred, the touch position and/or touch pressure when the touch occurs on the touch sensor panel 100. Also, the touch sensor panel 100 may be any panel which is configured to detect the size of a touched region including a node where a drive line and a sensing line have crossed each other when the touch occurs on the touch sensor panel 100. For example, the touch sensor panel 100 has a capacitive type in which the touch information is obtained from the change of capacitance by the touch, a resistive type in which the touch information is obtained from the change of resistance by the touch, an infrared type in which the touch information of the touch object is obtained by flowing infrared rays on the touch sensor panel 100 in up, down, right and left directions, and a pressure type in which the touch information is detected by the force distribution through a pressure sensor when a pressure is applied to the touch sensor panel 100, etc. Additionally, it is clear to those skilled in the art that any method can be applied as long as it is possible to detect whether or not the touch has occurred, touch position, touch pressure and/or the size of the touch region.

Hereafter, the configuration and operation of the touch sensor panel 100 according to the embodiment of the present invention will be briefly described by taking the capacitive type touch sensor panel an example thereof. However, the method for controlling the touch sensor panel 100 according to the embodiment of the present invention, that is, the method for identifying/removing the palm touch is not limited to the capacitive type touch sensor panel and can be applied to various type touch sensor panels 100.

Figure 4:
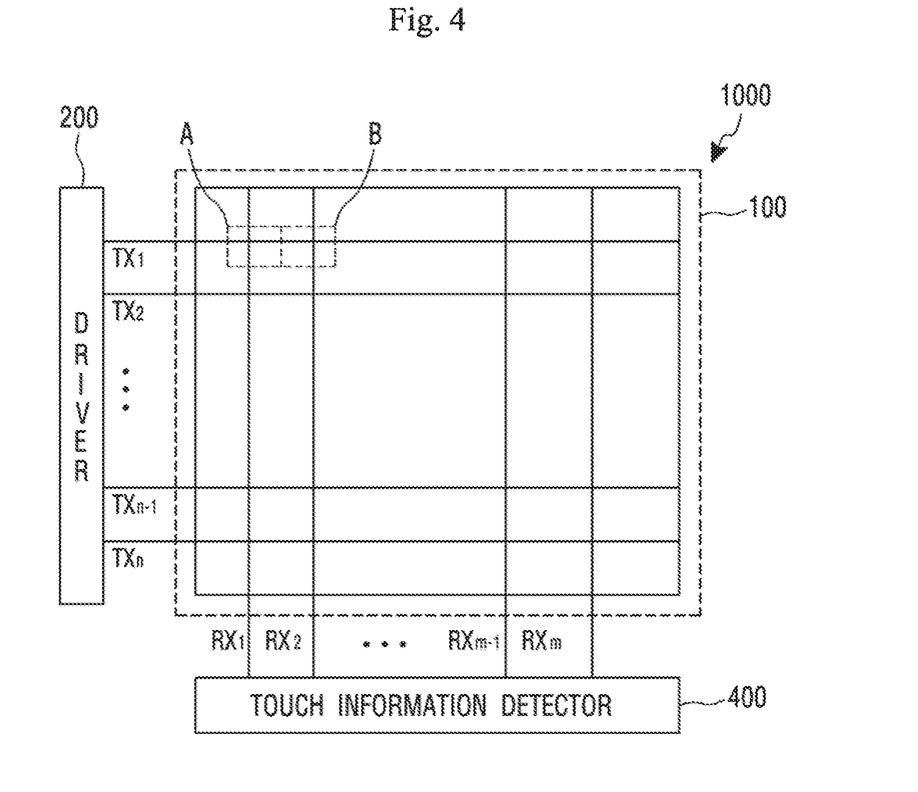
FIG. 4 shows an example of the touch sensor panel according to the embodiment of the present invention.

FIG. 4 shows an example of the capacitive type touch sensor panel 100 according to the embodiment of the present invention. Referring to FIG. 4, the touch sensor panel 100 may include a plurality of drive lines TX1 to TXn arranged in a first direction, a plurality of sensing lines RX1 to RXm arranged to cross the drive lines TX1 to TXn, and a plurality of sensing cells "A" and "B" formed at the node, i.e., the crossings of the drive lines TX1 to TXn and the sensing line RX1 to RXm. Here, although it is shown that the plurality of drive lines TX1 to TXn and the plurality of sensing lines RX1 to RXm are arranged to cross each other in the form of an orthogonal coordinate, this is just an embodiment. They may be also arranged to cross in the form of other geometrical structures (a concentric line and a radial line of a polar coordinate arrangement), etc. Also, the plurality of drive lines TX1 to TXn and the plurality of sensing lines RX1 to RXm may be disposed on the same plane. Also, an insulation layer (not shown) functioning as a dielectric material may be formed between the plurality of the drive lines TX1 to TXn and the plurality of the sensing lines RX1 to RXm.

The plurality of drive lines TX1 to TXn and the plurality of sensing lines RX1 to RXm may be formed on a transparent substrate (not shown). The drive lines and the sensing lines may be made of a transparent conductive material. Here, the transparent conductive material may be formed of indium-tin-oxide (ITO), indium-zinc-oxide (IZO) or carbon nano tube (CNT). Also, the plurality of drive lines TX1 to TXn and the plurality of sensing lines RX1 to RXm may be formed of a metal mesh or nano silver material.

When the object touches the touch sensor panel 100 formed as described above, the capacitances of the sensing cells "A" and "B" located at the touch position of the touch sensor panel 100 are changed, so that the touch sensor panel 100 can generate a touch signal which corresponds to the change of the capacitance.

The apparatus 1000 including the touch sensor panel 100 according to the embodiment of the present invention may further include a driver 200 which applies a driving signal to the drive lines TX1 to TXn of the touch sensor panel 100, and a touch information detector 400 which receives a signal including information on a capacitance formed between the drive lines TX1 to TXn and the sensing lines RX1 to RXm by applying the driving signal. Here, the driver 200 is not shown in FIG. 3. However, the driver 200 can be included in the control device 800 of the touch sensor panel 100 according to the embodiment of the present invention.

When the object like a finger or a stylus pen approaches close to the touch sensor panel 100, the value of the capacitance may be changed. The touch information detector 400 senses such electrical characteristics, and thus, can detect whether or not and/or where the touch has occurred on the touch sensor panel 100. For example, the touch information detector 400 can detect whether or not the touch has occurred on the touch sensor panel 100 and the touch position in a two-dimensional plane composed of a first axis and a second axis.

More specifically, when the touch occurs on the touch sensor panel 100, the drive line TX to which the driving signal has been applied, so that a second directional position of the touch can be detected. In the same manner, when the touch occurs on the touch sensor panel 100, the capacitance change is detected from the sensing signal received through the sensing line RX, so that a first directional position of the touch can be detected.

The touch information detector 400 according to the embodiment of the present invention may perform the obtaining the touch information (S810) of FIG. 2. The touch information detector 400 processes the sensing signal received from the sensing lines RX of the touch sensor panel 100, and thus, can obtain a coordinate value as well as a capacitance change amount due to the touch. The touch information according to the embodiment of the present invention may include the change amount of the received sensing signal (or capacitance change amount) and/or information on the coordinate on the touch sensor panel 100 where this change has occurred. The touch information detector 400 according to the embodiment of the present invention may be implemented by a touch sensing integrated circuit (IC). Here, the driver 200 can be also integrated on the same touch sensing IC in accordance with the embodiment of the present invention.

The detecting at least one valid touch by using the touch information obtained by the touch information detector 400 (S820) may be performed. In the embodiment of the present invention, the detecting the valid touch (S820) may be performed by a processor 500. For example, a first processing unit 510 of the processor 500 can detect whether or not the invalid touch has occurred on the touch sensor panel 100. For example, the first processing unit 510 can determine that the valid touch has occurred only when the capacitance change amount is greater than a predetermined reference value in the coordinate where the capacitance has changed.

Here, the predetermined reference value intends to prevent the change of a meaningless sensing signal from being recognized as a touch input by a signal error due to noise. This valid touch may include not only the direct touch on the touch sensor panel 100 but also hovering satisfying a predetermined condition. Here, the predetermined reference value may be changed according to the accuracy necessary for the embodiment, environment for embodiments, etc., and can be obtained through experiments. The predetermined reference value may be stored in a memory 600 shown in FIG. 3.

Here, one or more detected valid touch may occur at the same time or at mutually different times. The apparatus 1000 including the touch sensor panel 100 according to the embodiment of the present invention can recognize a plurality of simultaneous touches.

The processor 500 of the apparatus 1000 according to the embodiment of the present invention can perform the determining the valid touch which is included in the palm touch group among the at least one valid touch (S840). A second processing unit 520 included in the processor 500 shown in FIG. 3 can perform the above-described S840.

The apparatus 1000 according to the embodiment of the present invention may further include a controller 700 which causes the display unit 300 to perform the displaying the input corresponding to the valid touch other than the valid touch which is included in the palm touch group among the at least one valid touch, on the display unit (S830 and S850).

Hereafter, the determining the valid touch which is included in the palm touch group among the at least one valid touch (S840) will be described.

In the method for identifying/removing the palm touch in accordance with the embodiment of the present invention, the valid touch detected in S820 may be stored in the memory 600 according to the touch order (S841). The coordinates of the valid touch and/or time of the valid touch as well as the valid touch may be stored in the memory 600. Also, the sensing signal and/or value of the capacitance change by the valid touch can be stored. Here, the valid touch which is stored according to the embodiment may include a touch occurring during a predetermined time period before the present time point. A touch occurring outside of the predetermined time period may be deleted from the memory 600. Here, the predetermined time period may be set greater than a period of a backward tracking time $T_{BT}$ to be described below.

The second processing unit 520 determines whether each valid touch meets a palm touch condition or not. The second processing unit 520 can perform detecting the valid touch satisfying the palm touch condition as a palm touch (S842).

The palm touch condition may be stored in the form of a firmware in the memory 600 by default. Or, the palm touch condition may be changed according to the user's setting. In the latter case, the set palm touch condition may be stored in the memory 600.

The palm touch condition may include, for example, a condition of at least one of the touch shape, touch area and touch pressure. This is just an example. The palm touch condition may have another condition in accordance with the type of the touch sensor panel 100. When a shape similar to a hand knife touches the touch sensor panel 100, it can be determined that the touch is the palm touch. For example, when an elliptical shape of which the major and minor axes have a predetermined ratio or a half-moon shape touches the touch sensor panel 100, it can be determined that the touch is the palm touch. Also, for example, when a touch exceeds the range of the touch area and/or touch pressure which can be obtained by the diameter of the object touching the touch sensor panel 100, it can be determined that the touch is the palm touch. Therefore, a valid touch having a touch area and/or touch pressure which is greater than a first reference area and/or a first reference pressure can be detected as a palm touch. Here, in the case of the capacitive type touch sensor panel 100, the touch area can be calculated as the number of sensing cells in which the capacitance change amount is caused by one touch. Or, the touch pressure can be calculated as the sum of the capacitance change amounts of all of the sensing cells in which the capacitance is changed by one touch. Here, the first reference area and/or the first reference pressure may be set differently according to the object to be used.

When the stylus pen 10 is used as the object, the touch on the touch sensor panel 100 with an object like the finger 20 or palm other than the stylus pen 10 should be removed. In this case, the first reference area and/or the first reference pressure may be set as a value sufficient to distinguish a touch by the stylus pen 10 from a touch by the finger.

When the finger 20 is used as the object, the touch by the palm other than the finger 20 should be removed. In this case, the first reference area and/or the first reference pressure may be set as a value sufficient to distinguish the finger 20 from the palm.

In the foregoing, it has been assumed that the diameter of the stylus pen 10 is less than that of the finger 20. Accordingly, when the finger 20 is used instead of the stylus pen 10, the first reference area and/or the first reference pressure may be set as a greater value.

Also, since the user can use any object and the thickness of user's finger depends on the gender and age of the user, the embodiment of the present invention can be configured to allow the user to set the first reference area and/or the first reference pressure in accordance with the diameter of an object to be used. Or, the embodiment of the present invention can be configured to allow the apparatus 1000 to set the appropriate first reference area and/or the appropriate first reference pressure by at least one trial touch using the object.

According to the method for removing the palm touch in accordance with the embodiment of the present invention, even when a passive stylus pen instead of an active stylus pen is used as the object, the touch by the object like a hand other than the stylus pen can be effectively removed. Also, even when any object is used for the touch, a touch by an object other than the object can be effectively removed.

The palm touch detected by the above-described detecting the palm touch (S842) should be prevented from being displayed on the display unit 300.

The method for identifying and removing the palm touch in accordance with the embodiment of the present invention may further include filtering the palm touch (S843). The filtering the palm touch (S843) may include determining that the detected palm touch and all of the valid touches which are detected in a first region including the touch region of the palm touch during a first time period before a point of time when the palm touch has occurred are included in the palm touch group. That is, in the embodiment of the present invention, the backward tracking is performed during a previous predetermined time period until the point of time when the palm touch has been detected, so that the touch on the corresponding region is included in the palm touch group and is not displayed on the display unit 300.

Figure 5:
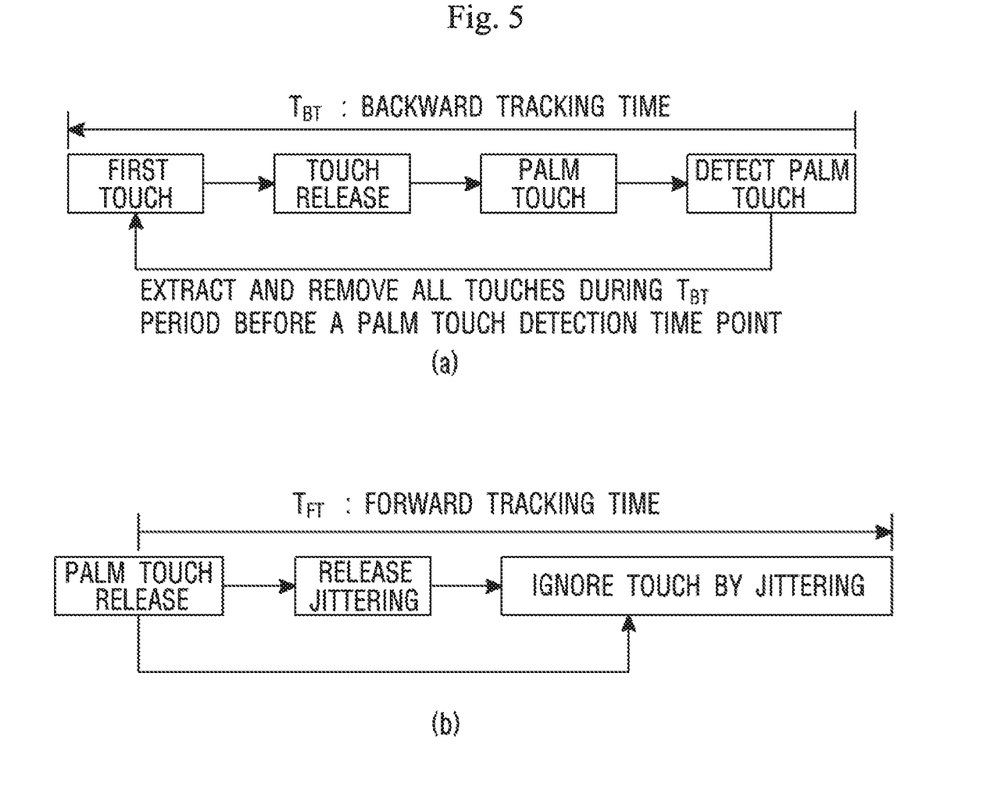
FIG. 5 is a view for describing (a) a backward tracking method and (b) a forward tracking method in the method for removing the palm touch in accordance with the embodiment of the present invention.

The backward tracking method according to the embodiment of the present invention is shown and described in (a) of FIG. 5. A touch sequence is shown in (a) of FIG. 5. A touch by the valid touch, release of the touch or the like may sequentially occur. Before the palm touch is detected, all touches may be recognized as a valid touch and processed. Here, when the touch of the third block is detected as a palm touch, the second processing unit 520 tracks backward the first time period $T_{BT}$ from the time when the palm touch has been detected. Here, during the corresponding first time period $T_{BT}$, all touches recognized as a valid touch may be classified into the palm touch group.

This is because the valid touch which is not recognized as a palm touch frequently occurs before the palm touch occurs. Palm has a curved surface. Therefore, when the palm touches the touch sensor panel 100, it is common that the palm does not touch at a time an area corresponding to the palm touch. Unless the backward tracking method according to the embodiment of the present invention is applied, when a touch as a pre-action for the palm touch on the touch sensor panel 100 occurs prior to the occurrence of the palm touch and the touch does not have a region wide enough to be determined as a palm touch, the touch may be displayed as a valid touch on the display unit 300. Therefore, through use of the backward tracking method according to the embodiment of the present invention, the above-described problem can be overcome. For example, although a first touch in FIG. 5 is detected as a valid touch first, the first touch is within the backward tracking time period according to the palm touch detection. Therefore, the first touch may be classified into the palm touch group. Accordingly, the input by the first touch can be prevented from being displayed on the display unit 300.

Here, the first time period $T_{BT}$ during which the backward tracking is performed at the time of occurrence of the palm touch can be generally determined by using statistical data of a time period from a point of time when the palm touches the touch sensor panel 100 to a point of time when the touch is determined as the palm touch. For example, since the writing habit, hand size, touch portion and direction between the hand and the touch sensor panel 100, etc., are various according to individual, the first time period $T_{BT}$ can be adaptively set by considering them. Also, the first time period $T_{BT}$ may be set by the user or may be set as a default value stored in the memory 600. Also, the first time period $T_{BT}$ may be set according to the capability of the structure within the apparatus 1000 including the touch sensor panel 100, which supports the above-described algorithm. For example, the first time period $T_{BT}$ may be limited according to the capability of the memory.

Here, the touch which is classified into the palm touch group may be intended to deal with a touch located within the first region including the region of the touch detected as a palm touch. For example, the first region may be within a first distance "d" from the edge of the touch region of the palm touch or may be within a second distance "D" from the center of the touch region of the palm touch. Or, the first region may be a times as large as the touch region of the palm touch. Here, the value of a is a scale factor and may be a rational number having a value greater than 1. Here, the distance "D" from the center of the touch region of the palm touch can be applied when the touch region of the palm touch has a shape such as a circle. For example, the touch region of the palm touch may have a circular shape, an elliptical shape, a half-moon shape, or any shape satisfying a predetermined condition.

Referring to FIG. 1, the touch region of the palm touch is indicated with a dotted circle by a reference numeral 21. This is just an example. The touch region of the palm touch may have any shape obtained by touching the touch sensor panel 100 with the palm. Here, the touch which can be classified into the palm touch group may occur in a larger region including the region indicated by the reference numeral 21. For example, the entire region within the first distance "d" from the edge of the palm touch region 21, or the entire region within the second distance "D" from the center of the palm touch region 21 may be classified into the palm touch group. Here, the first region 22 may be a times larger than the palm touch region 21.

This is because when a touch by a portion of the hand is the palm touch, a touch which occurs at the same time or at different times with the palm touch may occur by another portion of the hand. For example, when the palm touch is caused by a portion of the palm, it is highly probable that a touch by the finger, etc., which has not been determined as a palm touch, occurs at the same time with the palm touch or prior to the occurrence of the touch. Therefore, in the embodiment of the present invention, it is possible that a touch on a region wider than the palm touch region is included in the palm touch group and is removed.

Here, the first or second distance may be preset as a value greater than 0 according to the user's selection or a default value. Also, the scale factor α may be preset as a value greater than 1 according to the user's selection or a default value. When the user sets the first distance "d", the second distance "D" or the scale factor α, the user may consider the diameter of the object, user's hand size, user's habit of holding the object, etc. Or, an appropriate value can be set by default from the user's touch information collected by the apparatus 1000. This value may be stored in the memory 600.

When the palm touch group is classified by the backward tracking method, S850 may be performed from S843 as an arrow "a" indicates in FIG. 2. That is, the input which is detected in S820 and corresponds to the valid touch is displayed on the display unit 300 in S830. Since the touch which has been already detected as a valid touch through the backward tracking method is classified into the palm touch group in the future, deleting the input corresponding to the valid touch which is included in the palm touch group among the inputs already displayed on the display unit 300 (S850) may be performed.

This signifies a case where the touch on the touch sensor panel 100 is displayed on the display unit 300 in real time. In a case where the touch occurs on the touch sensor panel 100 at different times with the display on the display unit 300, S830 may be performed as indicated by an arrow "b". Here, in S830, only the input corresponding to the valid touch other than the valid touches classified into the palm touch group by the backward tracking method among the detected valid touches can be displayed on the display unit 300. This case corresponds to S830 and the method for removing the palm touch may be completed.

The filtering the palm touch (S843) may include determining that all valid touches which are detected within a second region including the touch region 21 of the palm touch from a point of time when the touch determined as a palm touch is released until a second time period $T_{FT}$ elapses are classified into the palm touch group. In other words, in the embodiment of the present invention, a forward tracking method is performed from a point of time when the palm touch is released until the elapse of a predetermined point of time, and then all touches on the corresponding region are included in the palm touch group and can be prevented from being displayed on the display unit 300.

The forward tracking method according to the embodiment of the present invention is shown and described in (b) of FIG. 5. A touch sequence is shown in (b) of FIG. 5. The forward tracking method according to the embodiment of the present invention can be performed from a time point when the touch determined as a palm touch is released. In the embodiment of the present invention, a touch occurring during the second time period TFT after the time point that the palm touch is released is ignored and can be prevented from being displayed on the display unit 300.

This is because, even after the palm touch is released, an error may occur due to the curved surface or elasticity of the hand, or a capacitance change of the touch sensor panel 100, which is caused by the temperature of the hand. For example, when the palm is released from the touch sensor panel 100, the touch area is gradually reduced, and thus, jittering may occur which causes the touch to be recognized as a valid touch without being recognized as a palm touch. Also, according to the embodiment of the present invention, when hovering which is not a direct touch on the touch sensor panel 100 is included in the valid touch, the above-described jittering may be more problematic.

As long as the forward tracking method is not applied to the control method and the control device 800 for the touch sensor panel 100 according to the embodiment of the present invention, when a portion of the hand still touches the touch sensor panel 100 during the release of the palm so as to release the palm touch, there may occur a problem that the touch is displayed as a valid touch on the display unit 300. Therefore, the embodiment of the present invention can solve the aforementioned problem by using the forward tracking method. In other words, according to the embodiment of the present invention, a touch on the corresponding region during the second time period $T_{FT}$ after the palm touch is released is ignored and can be prevented from being displayed on the display unit 300.

Here, the second time period $T_{FT}$ during which the forward tracking method is performed may be generally determined by using statistics of the time period from a point of time when the palm touch is released to a point of time when the palm is completely separated from the touch sensor panel 100. Also, the second time period $T_{FT}$ may be set by the user or may be set as a default value stored in memory 600. The description of the first time period $T_{FT}$ can be applied in the same manner to the setting of the second time period $T_{FT}$.

Here, the touch which is classified into the palm touch group may be intended to deal with a touch located within the second region including the region of the touch detected as a palm touch. Here, since the description of the second region is the same as that of the first region, the repetitive descriptions thereof will be omitted hereafter. Also, a third distance may correspond to the aforementioned first distance "d", and a fourth distance may correspond to the aforementioned second distance "D". However, this is just an example. Depending on the embodiment, the third distance may be set to be different from the first distance "d", and the fourth distance may be also set to be different from the second distance "D".

When the palm touch group is classified by the forward tracking method, S830 may be performed from S843 as an arrow "b" indicates in FIG. 2. That is, when the input which is detected in S820 and corresponds to the valid touch is displayed on the display unit 300 in S830, the input by the valid touch classified into the palm touch group through the forward tracking method can be controlled not to be displayed on the display unit 300.

Also, depending on the embodiment, when a long time is required for classifying into the palm touch group S840 or the result cannot be reflected in S830 in real time for a particular reason, S850 may be performed as the arrow "a" indicates. That is, the input corresponding to the valid touch detected in S820 is displayed on the display unit 300 in S830. Subsequently, S850 in which the input corresponding to the valid touch classified into the palm touch group by the forward tracking method is deleted on the display unit 300 may be performed.

Although FIG. 3 and the present specification show that the processor 500 is divided into the first processing unit 510 and the second processing unit 520, this is just an example. S820 in which the valid touch is detected and S840 in which the valid touch which is included in the palm touch group is determined can be all performed without distinction by one processor 500.

As described above, by applying the method for identifying/removing the palm touch in the control method and the control device 800 for the touch sensor panel 100 according to the embodiment of the present invention, the user is allowed to place his/her hand holding the object on the touch sensor panel 100 and perform a work, thereby reducing the fatigue of the hand and improving the operation accuracy of the touch sensor panel 100.

Also, by applying the method for identifying/removing the palm touch in the control method and the control device 800 for the touch sensor panel 100 according to the embodiment of the present invention, not only the touch determined as a palm touch, but a touch action related to the palm touch prior to or posterior to the palm touch is included in the palm touch group and is removed together with the palm touch, so that unintended touches of the user can be effectively reduced.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A control method for a touch sensor panel, the method comprising:
   obtaining touch information on the touch sensor panel from which an electrical signal outputted is changed according to a touch;
   detecting at least one valid touch from the touch information;
   determining that a valid touch of the at least one valid touch is included in a palm touch group by (a) detecting a palm touch, which meets a palm touch condition, among the at least one valid touch, and (b) determining all valid touches from a detection time of the palm touch to a predetermined backward tracking time; and
   displaying, on a display unit, an input corresponding to each of the at least one valid touch other than the valid touch included in the palm touch group.

2. The method of claim 1, wherein the determining the valid touch is included in the palm touch group comprises:
   determining that the valid touch is detected in a first region including a touch region of the palm touch during a first time period before the occurrence of the palm touch.

3. The method of claim 2,
   wherein the first region is within a first distance from the edge of the touch region of the palm touch or is within a second distance from the center of the touch region of the palm touch, and
   wherein the first or second distance is preset as a value greater than 0 according to a user's selection or a default value.

4. The method of claim 2, wherein the displaying comprises:
   displaying the input corresponding to each of the at least one valid touch on the display unit; and
   deleting the input corresponding to the valid touch included in the palm touch group among the input displayed on the display unit.

5. The method of claim 1, wherein the determining the valid touch is included in the palm touch group comprises:
   determining that the valid touch is detected within a second region including a touch region of the palm touch during a second time period after a point of time when the palm touch is released.

6. The method of claim 5, wherein the second region is within a third distance from the edge of the touch region of the palm touch or is within a fourth distance from the center of the touch region of the palm touch, and
wherein the third or fourth distance is preset as a value greater than 0 according to a user's selection or a default value.

7. The method of claim 5, wherein the second time period is preset as a value greater than 0 according to a user's selection or a default value.

8. The method of claim 1, wherein the at least one valid touch includes hovering on the touch sensor panel.

9. The method of claim 2, further comprising storing the at least one valid touch in a memory according to a touch order.

10. The method of claim 2, wherein the palm touch condition comprises a condition of at least one of a touch area and a touch pressure.

11. A control device of a touch sensor panel, the control device comprising:
a touch information detector which obtains touch information on the touch sensor panel from which an electrical signal outputted is changed according to a touch;
a processor which detects at least one valid touch from the touch information and determines that a valid touch of the at least one valid touch is included in a palm touch group by (a) detecting a palm touch, which meets a palm touch condition, among the at least one valid touch, and (b) determining all valid touches from a detection time of the palm touch to a predetermined backward tracking time; and
a controller configured to cause a display unit to display an input corresponding to each of the at least one valid touch other than the valid touch included in the palm touch group.

12. The control device of a touch sensor panel of claim 11, wherein the determining the valid touch is included in the palm touch group comprises:
determining that the valid touch is detected in a first region including a touch region of the palm touch during a first time period before a first time period before the occurrence of the palm touch.

13. The control device of a touch sensor panel of claim 12, wherein the first region is within a first distance from the edge of the touch region of the palm touch or is within a second distance from the center of the touch region of the palm touch, and
wherein the first or second distance is preset as a value greater than 0 according to a user's selection or a default value.

14. The control device of a touch sensor panel of claim 12, wherein, after the input corresponding to each of the at least one valid touch is displayed on the display unit, the controller causes a display unit to delete the input corresponding to the valid touch included in the palm touch group among the input displayed on the display unit.

15. The control device of a touch sensor panel of claim 11, wherein the determining the valid touch is included in the palm touch group comprises:
determining that the valid touch is detected within a second region including a touch region of the palm touch during a second time period after a point of time when the palm touch is released.

16. The control device of a touch sensor panel of claim 15, wherein the second region is within a third distance from the edge of the touch region of the palm touch or is within a fourth distance from the center of the touch region of the palm touch, and
wherein the third or fourth distance is preset as a value greater than 0 according to a user's selection or a default value.

17. The control device of a touch sensor panel of claim 15, wherein the second time period is preset as a value greater than 0 according to a user's selection or a default value.

18. The control device of claim 11, wherein the at least one valid touch includes hovering on the touch sensor panel.

19. The control device of a touch sensor panel of claim 12, further comprising a memory in which the at least one valid touch is stored according to a touch order.

20. The control device of a touch sensor panel of claim 12, wherein the palm touch condition comprises a condition of at least one of a touch area and a touch pressure.

* * * * *